No. 726,923. PATENTED MAY 5, 1903.
C. W. HINMAN.
GAS LIGHTING AND HEATING APPARATUS.
APPLICATION FILED MAR. 1, 1902.
NO MODEL. 2 SHEETS—SHEET 1.
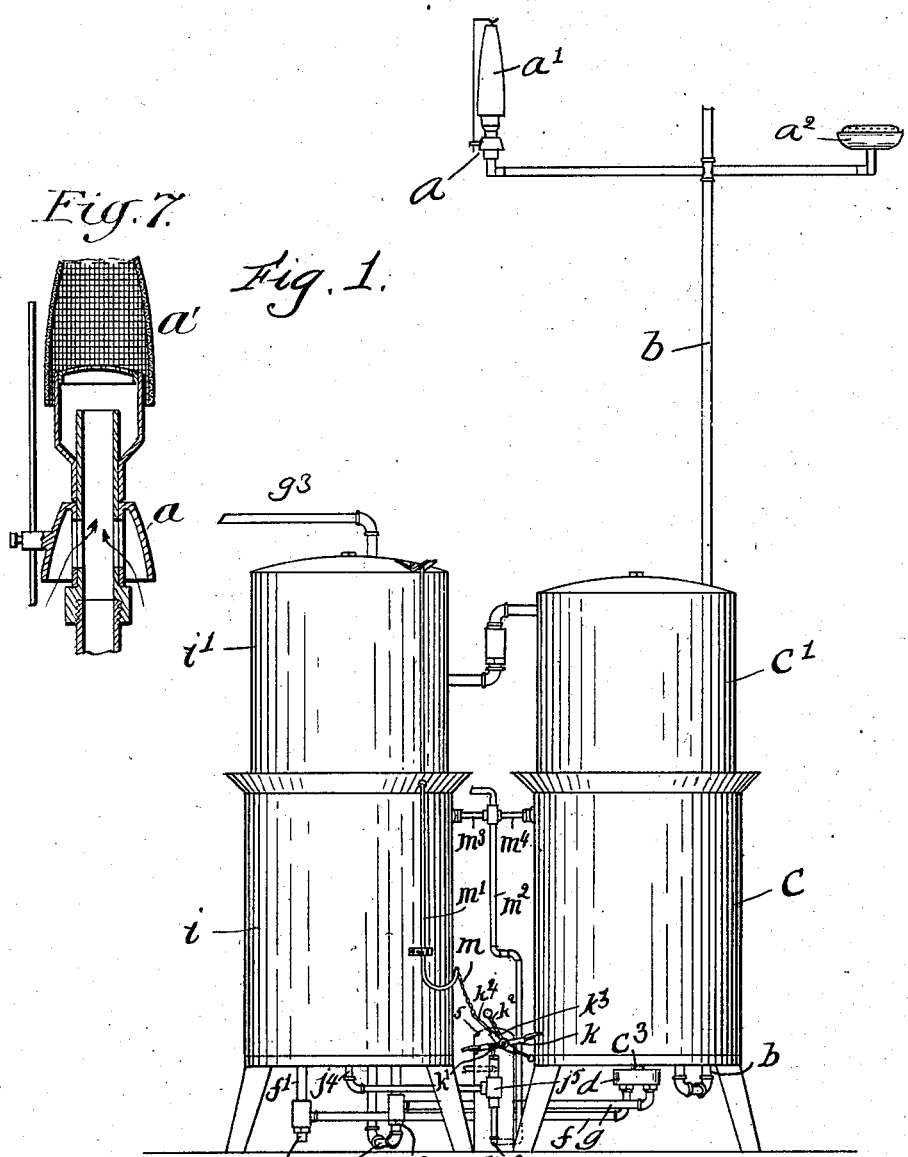
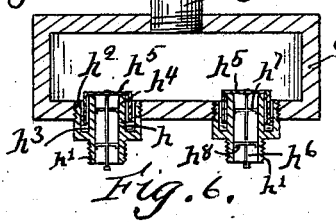

No. 726,923. PATENTED MAY 5, 1903.
C. W. HINMAN.
GAS LIGHTING AND HEATING APPARATUS.
APPLICATION FILED MAR. 1, 1902.
NO MODEL. 2 SHEETS—SHEET 2.
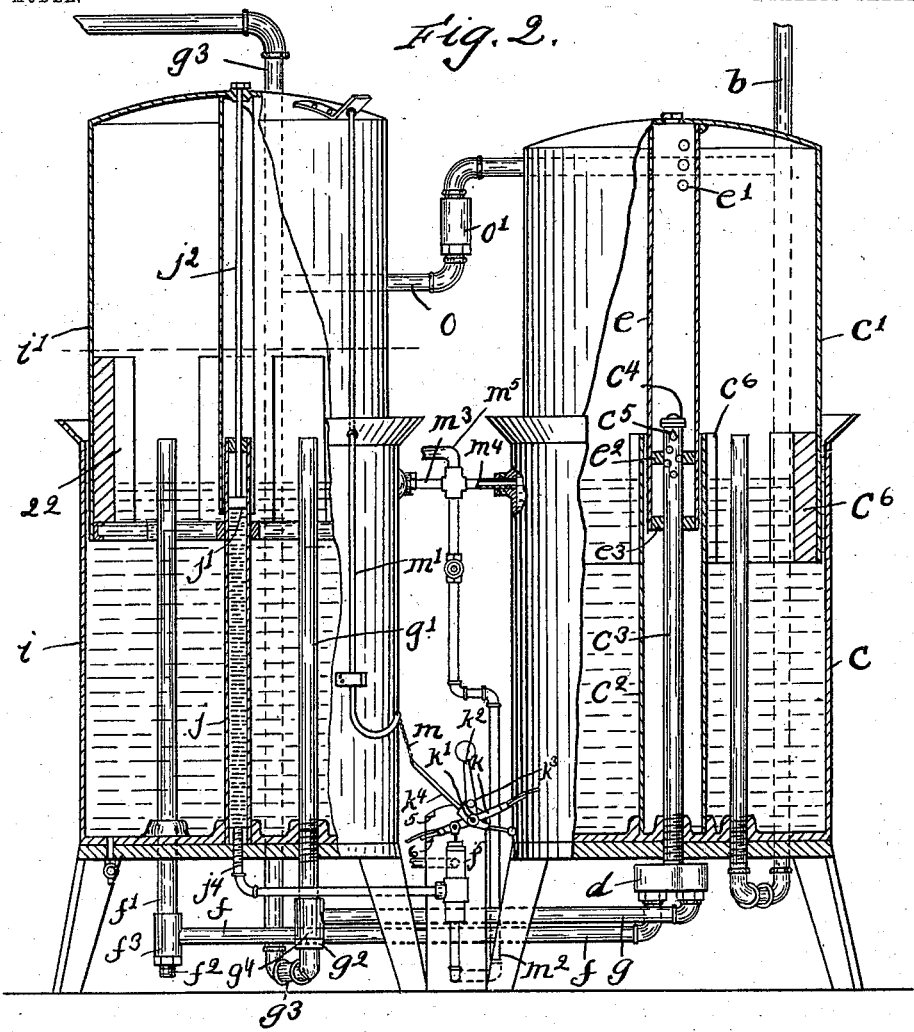
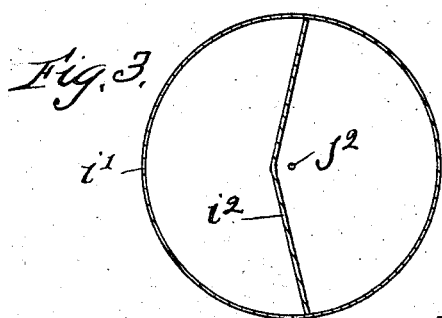
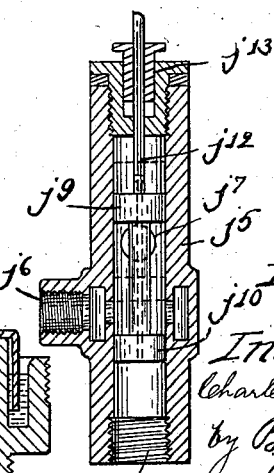
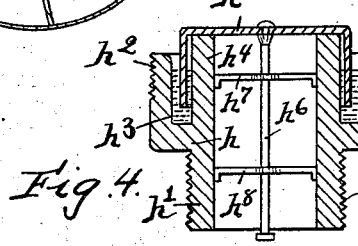
Witnesses:
H. B. Davis.
M. E. Bill.
Inventor:
Charles W. Hinman
by B. J. Hayes
atty No. 726,923. Patented May 5, 1903.

UNITED STATES PATENT OFFICE.

CHARLES W. HINMAN, OF BOSTON, MASSACHUSETTS.

GAS LIGHTING AND HEATING APPARATUS.

SPECIFICATION forming part of Letters Patent No. 726,923, dated May 5, 1903.

Application filed March 1, 1902. Serial No. 96,230. (No model.)

*To all whom it may concern:*

Be it known that I, CHARLES W. HINMAN, of Boston, county of Suffolk, State of Massachusetts, have invented an Improvement in Gas Lighting and Heating Apparatus, of which the following description, in connection with the accompanying drawings, is a specification, like characters on the drawings representing like parts.

Incandescent gas lighting as at present carried on consists in heating to incandescence a refractory mantle by a flame of gas mixed with an amount of air presumably sufficient for its complete combustion. This flame itself is nearly colorless, the light being produced by the incandescence of the refractory mantle suspended over the flame. The gas is usually supplied under a pressure less than three inches of water and is delivered to the base of the burner through one or more small holes, and the burner is open to the air at the bottom, so that the gas issuing from the small holes as jets draws in an amount of air presumably sufficient for complete combustion. In another system the gas before it reaches the burner is mixed with sufficient air for complete combustion and is burned from burners closed at the bottom. In this system the mixture of gas and air in the pipe before it reaches the burner is violently explosive, if ignited. It also requires extra-sized piping. In another system air under slight pressure and sufficient when mixed with the gas to effect complete combustion is conveyed by means of a separate pipe to the inside of the burner. In the first-mentioned system the pressure usually given the escaping gas is not sufficient to draw in and thoroughly mix with the gas an amount of air sufficient for complete combustion and at the same time give the resulting mixture a velocity beyond what is required to feed the flame. If it is attempted to draw in air sufficient to completely burn the gas, mix it with the gas and give the resulting mixture any additional velocity, the pressure required to be given the gas will be excessive. The other two systems, besides being open to other objections, require either extra-sized or additional piping.

This invention has for its object the production of an incandescent gas lighting or heating system by which the ordinary or standard sized gas-pipes may be used and a non-explosive mixture of air and gas produced, which is carried by the system of piping to a burner having air-inlets at the bottom and for lighting purposes bearing a mantle, and said mixed air and gas delivered at a velocity whereby additional air will be drawn in through the openings at the bottom of the burner in sufficient quantity to effect complete combustion and preferably at a velocity whereby a short intense flame similar to a blowpipe-flame will be produced. The candle-power is very materially augmented, and the heat generated is not limited to the combustion of the mixture carried by the system of piping.

The invention consists in the combination of means for mixing with the gas a quantity of air insufficient to effect complete combustion and for delivering the mixed air and gas to a burner having air-inlets at the bottom; also, in the combination of means for mixing with the gas a quantity of air insufficient to effect complete combustion and for delivering the mixed air and gas to a burner having air-inlets at the bottom under extraordinary pressure—that is to say, a pressure sufficient to produce a blowpipe effect—such a pressure for distinction being herein called a "blowpipe-pressure." The mixture when delivered under a blowpipe-pressure issues with considerable velocity from one or more small holes at the base of the burner and not only draws in the additional air required for complete combustion, but also results in the production of a short intense flame similar to a blowpipe-flame. The proportion of air mixed with the gas may vary considerably within certain limits—as, for instance, I may use two volumes of air to one of gas or one volume of air to two of gas, although ordinarily I find by mixing approximately equal volumes of air and gas a non-explosive mixture is obtained which is very efficient.

Figure 1 shows in front elevation a gas lighting and heating apparatus embodying this invention. Fig. 2 is an enlarged view of the holder for the mixed air and gas and the pump for delivering air and gas to said holder, the same being shown in front elevation and partial vertical section. Fig. 3 is a cross-sectional view of the bell of the pump. Fig. 4 is a vertical section of one of the liquid-sealed check-valves which I preferably employ. Fig. 5 is a vertical section of the valve of the hydraulic motor which operates to lift the bell of the pump. Fig. 6 is a vertical section of the hollow shell or case to which the air-pipe and gas-pipe leading from the pump are connected and also to which a common delivery-pipe is connected for delivering the air and gas to the mixer. Fig. 7 shows a sectional detail of a burner which may be employed having air-inlets at the bottom.

$a$ represents the burner of the ordinary Welsbach type, it being open at the base for the inlet of the air and bearing a refractory mantle $a'$, and $a^2$ represents another burner, of the ordinary Bunsen type, which may be employed for heating purposes. $b$ is a gas-pipe leading to said burner, which conducts the mixed air and gas from the holder to said burners. The holder, which is in many respects novel, will now be described, it being constructed and arranged to serve not only as a holder, but also as a mixer and a governor.

$c$ is a tank or receiver of any suitable shape and size adapted to contain a quantity of water or other sealing liquid, and $c'$ is a bell of a corresponding shape adapted to work up and down in said tank or reservoir $c$. The tank $c$ contains within it a tube $c^2$ or tubular cylinder, which is preferably centrally disposed therein and which rests upon the bottom of the tank and is suitably supported to occupy an upright position in the tank, said tube $c^2$ forming a central chamber which is open at the top and closed at the bottom. The tube $c^2$ projects from the base of the tank up to a point above the level of the water. A pipe $c^3$ of any suitable length and diameter is contained within the tube $c^2$, which passes up through the bottom of the tank $c$, and said pipe is preferably made long enough to project above the level of the water in the tank, although this is not material except in case of accidental leakage of the tube $c^2$. The pipe $c^3$ is closed at its upper end by a cap or plug $c^4$, and at or near its upper end portion, above the level of the water in the tank, a plurality of exit-orifices $c^5$ are provided, which are arranged in different planes or at different distances from the end of the pipe. The exit-orifices $c^5$ may be of any suitable shape, as circular or oblong, yet I prefer to make the uppermost one substantially triangular in shape, with the apex of the triangle at the top, as shown in Fig. 2. The pipe $c^3$, passing down through the bottom of the tank, is connected at its lower end to a hollow shell or case $d$, located beneath said tank, and said pipe $c^3$ is employed to conduct air and gas from said hollow shell or case $d$ to the bell of the holder.

A centrally-disposed tube $e$ is attached to the interior of the crown of the bell $c'$, which projects downward and is made long enough and small enough in diameter to project a short distance into the tube $c^2$. The diameter of the tube $e$ is less than the internal diameter of the tube $c^2$, yet moves telescopically within it as the bell rises and falls. The tube $e$ has a plurality of exit-orifices $e'$ at its upper end by which open communication between the bell and the interior of the tube $e$ is established. The tube $e$ has at its lower end two like disks or plates $e^2$ $e^3$ fitted into it and rigidly connected with it, each having a central hole through it adapting them to engage and slide along on the pipe $c^3$ as a guide. The disks or plates $e^2$ $e^3$ are located a short distance apart to form between them a closed chamber, and they are disposed relatively to the pipe $c^3$, so that the uppermost disk or plate $e^2$ works up and down on the pipe $c^3$ over the exit-orifices $c^5$, while the lowermost disk or plate always occupies the position below the lowermost exit-orifice. When the bell is in its most elevated position, the disk or plate $e^2$ will occupy a position above all the orifices $c^5$ or will be raised sufficiently to close the uppermost orifice, and as all the other orifices will be located beneath it and between it and the disk or plate $e^3$ it will be seen that all the orifices will be effectively closed. As the bell falls the uppermost orifice $c^5$ is first opened and then the others. The gas issuing from the uppermost orifice $c^5$ or any of the orifices enters the tube $e$ and passes through the orifices $e'$ into the bell. The bell is made quite large to hold considerable mixed air and gas and is normally held in its most elevated position, and therefore serves as a holder. The bell settles a little as the gas is taken from the pipe $b$; but as the volume of gas taken from said pipe $b$ is immediately compensated for by an inflow to the mixer or holder from a pump, to be described, the bell will only settle a little and will come to a position of rest as soon as the inflow of gas equals the outflow, and then as soon as the inflow exceeds the outflow the bell will be lifted or restored to its normal elevated position. Therefore in practice, barring accidents, the bell will have but a limited movement. The inflow of gas to the bell is regulated by the exit-orifices $c^5$, which are opened more or less, according to the position of the bell. If but a small volume of gas is being taken from the pipe $b$, the bell will settle but a little, thereby opening more or less of the uppermost orifice $c^5$; but if a large volume of gas is being taken from the pipe $b$ the bell will settle further and open a number of the exit-orifices, yet as soon as the outflow ceases the bell immediately rises and shuts off the inflow. Therefore the pipe $c^3$, having the exit-orifices and the devices coöperating therewith for controlling the inflow of gas, together serve as a controlling device or constitute a valve by which the delivery of air and gas from the pump is regulated. This holder holds a variable volume of gas under constant pressure. The bell $c'$ is provided with weights $c^6$, any number of which may be employed, whereby the gas will be delivered to the pipe $b$ under extraordinary or blowpipe-pressure—say, for instance, a pressure equal to six inches of water.

$f$ represents an air-pipe, and $g$ a gas-pipe, leading to the hollow shell or case $d$, (see Figs. 1 to 6,) which respectively conduct air and gas thereto in predetermined relative proportions, so that by pipe $c^3$ the air and gas more or less mixed will be delivered to the holder through the orifices $e'$ and thereafter more thoroughly and uniformly mixed in said holder.

Within the hollow shell or case $d$ two check-valves are provided, (see Fig. 6,) one of which controls the delivery of air from the pipe $f$ and the other controls the delivery of gas from the pipe $g$. These check-valves are made alike, or substantially so, and are herein illustrated in Fig. 4.

$h$ represents a tubular shell which is made as a coupling or pipe-fitting, having an externally-screw-threaded portion $h'$ at one end and an externally-screw-threaded portion $h^2$ at the opposite end. One end of the tubular shell $h$ is formed or provided with a circular groove or recess $h^3$, made concentric with the shell inside of the screw-threaded portion $h^2$, which is made quite deep and adapted to contain a liquid sealing material. The screw-threads $h^2$ are thus formed in the outside of the outer wall of said groove or recess, and the inside wall $h^4$ thereof preferably rises above the outside wall a short distance. A valve-plate made as an inverted cup $h^5$ is employed, which is of suitable diameter to rest by gravity upon the wall $h^4$, its side wall projecting down into the groove or recess $h^3$ and into the mercury contained in said groove or recess. When the valve-plate is in this position, as shown in Fig. 4, the valve is closed. By lifting the cup-like valve-plate sufficiently for its side wall to rise above the sealing liquid contained in the groove or recess $h^3$ the valve will be opened for the passage of the air or gas. The inverted cup-like valve-plate has a central stem $h^6$ projecting downward through the tubular shell, which passes through suitable guides $h^7 h^8$, contained in said tubular shell, which may be made as spiders secured to said tubular shell. This form or construction of check-valve is important, for the reason that the valve-plate is not liable to stick by reason of the accumulation of any tar products, a serious trouble ordinarily encountered in gas-machines. The mercury which is employed as the sealing liquid for the valve is of a high specific gravity, and in practice I preferably employ a liquid-sealed valve, for the reason that the same is gas-tight, and I employ a sealing liquid of a high specific gravity, for the reason that a valve of very small dimensions may be employed. In practice the sealing liquid must overcome or resist the back pressure of, say, six to eight inches of water, and if a sealing liquid of light specific gravity—as water, for instance—should be employed a very long valve would be required, necessitating a valve-plate having a very long stroke.

The pump employed is adapted to simultaneously deliver air and gas in predetermined quantities to the holder by the conducting-pipes $f$ and $g$, and in accordance with this invention the relative quantities of air and gas delivered will be insufficient when mixed to produce complete combustion, thereby differing essentially from the pumps of gas-machines known to me.

$i$ represents a tank adapted to contain water or other liquid, and $i'$ a bell working up and down therein. The bell $i'$ is provided with a partition-wall $i^2$, which divides it into two compartments or chambers, and, as herein shown, said compartments or chambers are of approximately equal cubic capacity, although slight variations may be made whereby either one of said chambers or compartments may be larger than the other. A pipe $f'$ is connected with the pipe $f$, which projects up through the bottom of the tank $i$ to a point above the level of the water, and at the junction of said pipes $f f'$ a T-coupling $f^3$ is provided, containing or having connected with it at its lower end a check-valve $f^2$, opening to the atmosphere. When the bell is lifted, the check-valve will be opened and a supply of air will be drawn into the air-compartment of the bell, and when the bell falls said check-valve will be closed and the air will be conducted by the pipe $f$ to the hollow shell $d$ of the holder. A pipe $g'$ is similarly connected to the pipe $g$, which projects up through the bottom of the tank $i$ to a point above the level of the water, and at the junction of said pipes $g g'$ a T-coupling $g^4$ is provided, containing or having connected to it at its lower end a check-valve $g^2$, to which a pipe $g^3$ is connected, which is connected with any suitable gas-supply pipe. When the bell $i'$ is lifted by a suitable motor, to be described, the check-valve $g^2$ will be opened and a supply of gas will be drawn into the gas-compartment of the bell, and when said bell falls said check-valve $g^2$ will be closed and the gas will be conducted by the pipe $g$ to the hollow shell $d$ of the holder. The delivery of the air and gas to the holder is simultaneous. The check-valves $f^2$ and $g^2$ will be constructed as mercury check-valves, as shown in Fig. 4. The bell $i'$ is provided with a number of large weights $i^3$, which will cause it to descend and deliver the air and gas to the holder at a pressure greater than the pressure employed by said holder in delivering the mixed air and gas to the pipe $b$, so as to lift the bell $c'$ of the holder and maintain it in elevated position. The bell $i'$ is designed to be lifted automatically, and, as herein shown, a hydraulic motor is provided, which may be of any ordinary construction.

Contained within the tank $i$ is a cylinder $j$ of small diameter, which is connected at the bottom to the base of the tank, and said cylinder has at its upper end a stuffing-box in which a piston-rod $j^2$ works, having a piston $j'$ at its lower end working in the cylinder, the upper end of said piston-rod being attached to the crown of the bell $i'$. The cylinder $j$ has connected to its lower end a pipe $j^4$, which is connected to the outlet-port of the valve-case $j^5$. (See Figs. 1 to 5.) The valve-case $j^5$ is provided with an outlet-port $j^6$, to which said pipe $j^4$ is connected, an inlet-port $j^7$, and a waste-port $j^8$ and contains two pistons $j^9$ $j^{10}$, attached to a rod $j^{12}$, working in a stuffing-box $j^{13}$ at the upper end of the cylinder. The pistons $j^9$ $j^{10}$ are disposed on the rod in such relative position as to occupy different positions with relation to the ports when the rod bearing them is moved—as, for instance, in one position, as shown by full lines, Fig. 5, the outlet and inlet ports open into a chamber or space between said pistons, and when in such position the water passes from the inlet-port through the outlet-port and into the cylinder $j$ and acts to lift the bell $i'$, and when said pistons occupy the dotted-line position shown in Fig. 5 the inlet-port is disconnected from the outlet-port and the outlet-port connected with the waste-port. The piston-rod $j^{12}$ is loosely connected at its upper end to a rocking bar $k$, pivoted at $k'$ to a suitable support, and said bar is acted upon by ordinary tumbler devices, which are connected by a chain or cord $m$ with a rod $m'$, which is attached to the bell. The tumbler devices for operating a rocking bar $k$ consist of a weighted arm $k^2$, loosely pivoted at $k'$ independent of the rocking bar, which is adapted to be thrown in opposite ways to engage and operate said bar $k$. The weighted arm $k^2$ has a lateral projection $k^3$, which is engaged by a pivoted counterbalanced arm $k^4$, also loosely pivoted at $k'$ independent of the other parts. One end of the arm $k^4$ is connected by the chain or cord $m$ with the rod $m'$. As the bell rises one end of the arm $k^4$ is lifted, and said arm by engaging the projection $k^3$ on the weighted arm lifts said weighted arm into perpendicular position and throws it a little farther, and as soon as said weighted arm passes its perpendicular position it falls by gravity to the right, Fig. 2, and its weighted end striking one of the extremities of the rocking bar $k$ rocks said bar on its pivot, and thereby raises the pistons $j^9$ $j^{10}$ until said rocking bar strikes the stop 5. Then as the bell falls the pivoted arm $k^4$ will be moved on its pivot in the opposite way and engaging the projection on the weighted arm will lift said arm into its perpendicular position and throw it a little farther, and then as said weighted arm falls to the left its weighted end will strike the other extremity of the rocking bar $k$ and rock said bar on its pivot until said bar strikes the stop 6, and during this movement of said rocking bar the pistons $j^9$ $j^{10}$ will be moved in the opposite way. The waste-port of the valve has connected to it a pipe $m^2$, which extends upward to a pipe $m^5$, which is located at a height that it is desired to maintain the level of the water in the tanks $i$ and $c$, and from said waste-pipe $m^2$ two branch pipes $m^3$ $m^4$ lead in opposite ways, one to the tank $i$ and the other to the tank $c$. As the water passes along the waste-pipe $m^2$ and $m^5$ it will flow through said pipes $m^3$ $m^4$ if the level of the water in said tanks is below the pipe $m^5$.

By the apparatus herein described predetermined proportions of air and gas will be delivered to the holder at an extraordinary pressure and in said holder will be mixed and then delivered to the pipe $b$ at a blowpipe-pressure, and at the burner additional air will be drawn in to effect complete combustion.

The mixed air and gas in the fixed relative proportions herein employed is not explosive, and the pipe $b$ leading to the burner may be of ordinary or standard size, and as the mixed air and gas is delivered at a blowpipe-pressure a short intense flame similar to a blowpipe-flame will be produced and the candle-power of the light is very materially augmented.

The apparatus may be employed for heating purposes as well as lighting purposes, and in such event corresponding advantages will be derived.

In case of accident I have provided means whereby the machine is shunted and the gas taken directly from the gas-pipe $g^3$ and delivered to the gas-supply pipe $b$. The means herein shown for accomplishing this result consists of a connecting-pipe $o$ between said pipes $g^3$ and $b$, which at any desired point contains a check-valve $o'$, which may be a mercury check-valve, as shown in Fig. 4, and when the pressure on said check-valve decreases to a point less than the gas-pressure in the pipe $g^3$ said check-valve will open and establish communication between said pipes. Normally the check-valve will be held closed by the blowpipe-pressure of the holder. This connecting-pipe, with a check-valve, may be employed in connection with machines differently constructed from that herein shown with good results, and consequently, so far as said connecting-pipe is concerned, I do not desire to limit my invention to the construction of the machine which it is employed to shunt.

In case the pressure device of the holder should not be great enough to produce a blowpipe effect then the short intense blowpipe-flame will not be produced; but even in such event a light of great candle-power will be produced, as additional air will be drawn in at the burner to mix with the previously-mixed air and gas.

I do not desire to limit my invention to the employment of a holder which is designed to also serve as a governor, yet such form of holder I prefer to employ.

In another application, Serial No. 103,018, filed by me April 15, 1902, a gas lighting and heating apparatus is shown comprising, essentially, a holder for holding a variable volume of mixed air and gas under constant pressure, a delivery-pipe leading from it to the burner, a pump connected with said holder for simultaneously delivering measured volumes of air and gas thereto, air and gas inlets to said pump, means controlled by the volume of mixed air and gas in said holder for regulating the delivery of air and gas thereto, and a motor for operating said pump. Also in said application a pump is provided with a two-compartment bell. Also in said application a simple arrangement of pipes and check-valves is employed for controlling the inlet and outlet of air and gas from the pump, and such features I do not herein broadly claim, as they form the subject-matter of the aforesaid application.

The particular construction of the holder herein shown forms the subject-matter of another application, Serial No. 103,286, filed by me, and the means for maintaining a predetermined level of the water in the tank of the pump and the holder and means for connecting the gas-supply pipe leading to the pump with the delivery-pipe leading from the holder form the subject-matter of another application, Serial No. 110,764, filed by me, and are therefore not herein claimed.

What I do claim, and desire to secure by Letters Patent, is—

1. The combination of a burner having air-inlets at the bottom, a pipe leading thereto, means for supplying air and gas to said pipe in fixed relative proportions insufficient to produce complete combustion, and a motor for operating said means, substantially as described.

2. The combination of a burner having air-inlets at the bottom, a pipe leading thereto, a holder from which said pipe leads for holding mixed air and gas, a pump for delivering air and gas to said holder in fixed relative proportions insufficient to effect complete combustion, air and gas inlets to said pump, and a motor for operating said pump, substantially as described.

3. The combination of a burner having air-inlets at the bottom, a pipe leading thereto, a holder from which said pipe leads for holding mixed air and gas, a pump for simultaneously delivering air and gas to said holder in fixed relative proportions insufficient to effect complete combustion, air and gas inlets to said pump, and a motor for operating said pump, substantially as described.

4. The combination of a burner having air-inlets at the bottom, a pipe leading thereto, a holder from which said pipe leads for holding a variable volume of mixed air and gas under constant pressure, a pump for delivering air and gas to said holder in fixed relative proportions insufficient to effect complete combustion, a gas-pipe connected to said pump leading from a suitable gas-supply, and an air-pipe also connected to said pump, substantially as described.

5. The combination of a burner having air-inlets at the bottom, a pipe leading thereto, a holder from which said pipe leads for holding a variable volume of mixed air and gas under constant pressure, a pump connected with said holder for simultaneously delivering air and gas thereto in fixed relative proportions insufficient to effect complete combustion, air and gas inlets to said pump, and a motor for operating said pump, substantially as described.

6. The combination of a burner having air-inlets at the bottom, a pipe leading thereto, means for supplying air and gas to said pipe in fixed relative proportions insufficient to produce complete combustion and at a "blowpipe-pressure," and a motor for operating said means, substantially as described.

7. The combination of a burner having air-inlets at the bottom, a pipe leading thereto, a holder from which said pipe leads for holding mixed air and gas, and for delivering the mixed air and gas at a "blowpipe-pressure," and a pump for delivering air and gas to said holder in fixed relative proportions, substantially as described.

8. The combination of a burner having air-inlets at the bottom, a pipe leading thereto, a holder from which said pipe leads for holding mixed air and gas, and for delivering the mixed air and gas at a "blowpipe-pressure," and a pump for delivering air and gas to said holder in relative proportions insufficient to effect complete combustion, substantially as described.

In testimony whereof I have signed my name to this specification in the presence of two subscribing witnesses.

CHARLES W. HINMAN.

Witnesses:
B. J. NOYES,
H. B. DAVIS.